United States Patent
Kuhn et al.

(10) Patent No.: US 10,006,581 B2
(45) Date of Patent: Jun. 26, 2018

(54) METHOD FOR PRODUCING A VACUUM INSULATING BODY

(71) Applicant: VA-Q-TEC AG, Wurzburg (DE)

(72) Inventors: Joachim Kuhn, Wurzburg (DE); Roland Caps, Kleinwallstadt (DE)

(73) Assignee: VA-Q-TEC AG, Wurzburg (DE)

( * ) Notice: Subject to any disclaimer, the term of this patent is extended or adjusted under 35 U.S.C. 154(b) by 448 days.

(21) Appl. No.: 14/888,974

(22) PCT Filed: Feb. 1, 2014

(86) PCT No.: PCT/EP2014/000265
§ 371 (c)(1),
(2) Date: Nov. 4, 2015

(87) PCT Pub. No.: WO2014/183814
PCT Pub. Date: Nov. 20, 2014

(65) Prior Publication Data
US 2016/0084424 A1    Mar. 24, 2016

(30) Foreign Application Priority Data
May 15, 2013 (DE) .................. 10 2013 008 263

(51) Int. Cl.
*F16L 59/065* (2006.01)
*B65B 31/02* (2006.01)

(52) U.S. Cl.
CPC .......... *F16L 59/065* (2013.01); *B65B 31/024* (2013.01)

(58) Field of Classification Search
CPC ......... F16L 59/065; F16L 59/06; F16L 59/07; F16L 59/075; B65B 31/024; B65B 31/02; B65B 31/021; B65B 31/022; B65B 31/04; B65B 39/00; B65B 31/006
See application file for complete search history.

(56) References Cited

U.S. PATENT DOCUMENTS

| 3,843,806 A | 10/1974 | Kishpaugh et al. |
| 5,331,789 A | 7/1994 | Cur et al. |
| 7,833,605 B2 | 11/2010 | Tenra et al. |
| 8,236,401 B2 * | 8/2012 | Song ................. B32B 3/02 428/69 |
| 9,103,114 B2 * | 8/2015 | Kojima .................. E04B 1/803 |
| 9,523,459 B2 * | 12/2016 | Min ...................... F16L 59/065 |

FOREIGN PATENT DOCUMENTS

| DE | 102004011614 | 2/2005 |
| DE | 102007042039 | 3/2009 |
| DE | 102009024484 | 12/2010 |

(Continued)

OTHER PUBLICATIONS

International Preliminary Report on Patentability, PCT/EP2014/000265, dated Nov. 17, 2015.

*Primary Examiner* — David Walczak
(74) *Attorney, Agent, or Firm* — Andrus Intellectual Property Law, LLP

(57) ABSTRACT

A method is for producing a vacuum insulating body (vacuum insulation panel; VIP) made of a vacuum-tight foil or foil connection and a flat filter material, in particular a single-layer or multi-layer non-woven material, which is air-permeable but is not permeable for a powdered filling material.

13 Claims, 5 Drawing Sheets

(56) References Cited

FOREIGN PATENT DOCUMENTS

Figure 1:
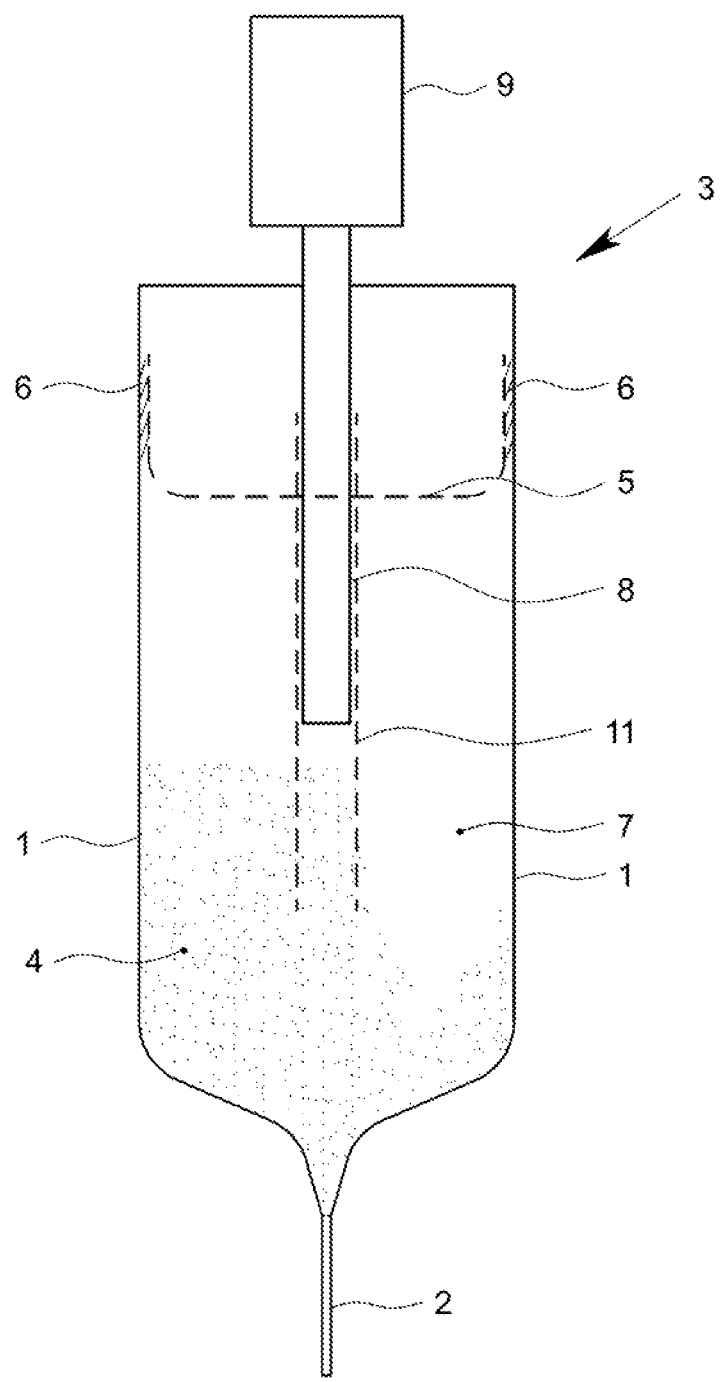

| | | |
|---|---|---|
| DE | 102010019074 | 3/2011 |
| DE | 102008022380 | 11/2011 |
| EP | 1 926 931 | 12/2009 |
| WO | 2003/072684 | 9/2003 |
| WO | 2007/033836 | 3/2007 |

* cited by examiner

METHOD FOR PRODUCING A VACUUM INSULATING BODY

CROSS-REFERENCE TO RELATED APPLICATIONS

This application is the U.S. national stage application of International Application PCT/EP2014/000265, filed Feb. 1, 2014, which international application was published on Nov. 20, 2015, as International Publication WO 2014/183814. The International Application claims priority of German Patent Application No. 10 2013 008 263.3, filed May 15, 2013. The international application and German application are incorporated herein by reference, in entirety.

The invention relates to a method for producing a vacuum insulating body (vacuum insulation panel; VIP).

Evacuated insulating materials achieve thermal conductivities that are lower by a factor of 5 to 20 than those of non-evacuated, conventional insulating materials. They can be used to produce compact, highly insulating transport containers for temperature-sensitive products, highly insulated refrigerating and freezing equipment or slender insulating structures for buildings. Such evacuated insulating bodies are typically referred to as vacuum insulating bodies or, if they are in sheet form, also as vacuum insulation panels, or VIP for short. This term is used hereinafter for these vacuum insulating bodies.

Suitable for the core of the vacuum insulating bodies are compression-resistant materials in the form of powder plates, powder fills, open-cell foams or glass fiber materials. Particularly insulating cores comprising powder plates or loose powder are usually also enveloped in an air-permeable polyester nonwoven to reduce the formation of dust. This is intended to prevent dust from escaping during the evacuation operation in a vacuum chamber and prevent sealing seams at connecting edges and/or the vacuum chamber from becoming contaminated.

VIPs with a filling of fused silica powder have a fine pore structure and allow relatively high gas pressures without the thermal conductivity of the residual gas playing a part. Thus, in the case of these microporous materials, only a vacuum of 1 to 10 mbar is necessary to bring the thermal conductivity to 0.003 to 0.005 W/mK. Envelopes comprising special vacuum-tight films, known as high barrier films, which have only a wafer-thin, vapor-deposited coating of aluminum, ensure that the gas pressure in the core material only rises by about 1 mbar a year. However, the existing production processes for VIPs with a powder filling require a relatively great effort and cannot be automated completely.

EP 1 926 931 B1 discloses a method for producing a VIP with the following method steps: firstly, powder is filled into a bag that is open at one end and comprises high barrier films. Subsequently, a flat filter material that is permeable to air but not permeable to the powder is fastened in the vicinity of the opening to the inner side of the film bag in such a way that the interior of the bag is closed off in a dust-tight manner, but air can escape. After that, the interior space is evacuated and finally the bag is sealed in the evacuated state. During the evacuation, the fine powder particles are completely retained in the bag by the filter material provided in the bag opening, even when gas flows are strong, so that the vacuum chamber and the sealing seams at the connecting edges are not contaminated.

In the case of the known method, the powder is allowed to fall into the interior of the bag under the effect of gravitational force via the filling opening of the empty bag with the aid of a filling tube. When the filling tube is withdrawn, contamination of the sealing areas with powder can occur, so that the subsequent sealing of the remaining opening, in particular with the filter nonwoven, or alternatively with the high barrier film, may be unsound.

The teaching addresses the problem of improving the known method for producing a vacuum insulating body in such a way that contamination of the sealing seams at the connecting edges by powder-like filling material is reliably avoided.

According to claim 1, the method according to the invention for producing a vacuum insulating body (vacuum insulation panel; VIP) has the following method steps:

a) A vacuum-tight film or film connection is provided.
b) A flat filter material that is permeable to air but not permeable to a powder-like filling material is provided.
c) The flat filter material is firmly connected to the film or film connection at the edges in such a way that the connecting edge between the flat filter material and the vacuum-tight film or film connection is in any case not permeable to the powder-like filling material.
d) The vacuum-tight film or film connection on the one hand and the flat filter material on the other hand are arranged in such a way that a receiving space that can be filled with filling material and is closed off with respect to the outside is obtained in between.
e) The flat filter material is passed through by means of a filling element of a filling device for the powder-like filling material.
f) With high ambient pressure, in particular therefore under normal atmospheric pressure, a desired amount of powder-like filling material is filled into the receiving space through the filling element, preferably under a filling pressure that is higher than the ambient pressure.
g) After completion of the filling of the receiving space, the filling element is removed from the flat filter material and the flat filter material is closed again at the location concerned.
h) The composite comprising the film or film connection and the flat filter material and also the filling material located in the receiving space as a whole is brought to a pressure that is considerably lower than the ambient pressure in method step f) (vacuum) and the receiving space and the powder-like filling material located therein are thereby vented through the flat filter material.
i) With a sustained vacuum, the vacuum-tight film or film connection is firmly sealed completely around the edges in such a way that this connecting edge is not permeable to air, and thus the receiving space as a whole is sealed in an air-tight manner.

The method according to the invention can be used to achieve a bag-like shaped configuration of the composite comprising the first vacuum-tight film and the flat filter material, the receiving space of which is filled through the flat filter material by means of the filling element. After the removal of the filling element, the flat filter material is closed again at the location concerned. The resultant product is sealed in a completely dust-tight manner.

Preferred refinements and developments of the method according to the invention are the subject of the subclaims.

Suitable for example as the powder filling are microporous silica powders, in particular of fused or precipitated silica, perlite powder, in particular also of expanded or ground perlite, nano and micro polymer powders, powder of pulverized open-cell organic foams, pourable glass fiber materials with short fiber lengths, aerogels or other nano-structures and also sheets of pressed powders, a proportion of which of up to 80% may consist of recycled material. Generally, an opacifier is also admixed with these powders in a ratio of 2 to 50%, but in particular of 15 to 50%, to reduce the passage of heat radiation. The opacifiers may in this case be for example carbon black, graphite, titanium dioxide, SiC or iron oxide.

Used with preference is a flat filter material of a single-layer or multi-layer nonwoven material, for example a polyester nonwoven. This can be connected, in particular adhesively bonded, in a dust-tight manner to a polyethylene sealing layer at the connecting edge of the first vacuum-tight film under the influence of heat.

A nonwoven with a weight per unit area of 20 to 60 g/m$^2$ is preferably used, the total weight per unit area of the nonwoven materials lying between 20 and 120 g/m$^2$.

It is particularly preferred that an air-permeable material of the kind that re-seals itself after removal of the filling element in such a way that it is impermeable to the filling material also at the location concerned is used as the flat filter material. A nonwoven material, single-layer or multi-layer, can also be used particularly expediently for this function. Alternatively, however, it may also be provided that the flat filter material or the connecting edge between the flat filter material and the film or film connection is provided with a self-sealing valve and the passing through of the flat filter material in method step e) takes place by means of the valve or through the valve.

There are various possibilities for the design of the filling element. With particular preference, a filling tube, preferably one of metal, through which the powder-like filling material can be blown into the receiving space, can be used.

It is possible in principle to provide the vacuum-tight film or film connection on the one hand and/or the flat filter material on the other hand already in each case in a size suitable for the vacuum insulation panel to be produced. Preferably, however, the vacuum-tight film or film connection on the one hand and/or the flat filter material on the other hand are provided in each case as roll material and are then processed continuously in the method.

For the sealing of the product in method step i) it is possible to use a second vacuum-tight film or film connection, which is then connected in an air-impermeable manner to the first vacuum-tight film or film connection at the connecting edge. Alternatively, it is also possible simply to seal the bag at its open side by the first vacuum-tight film or film connection, that is to say connect the vacuum-tight film or film connection to itself in an air-impermeable manner, in order in this way to seal the receiving space as a whole in an air-tight manner.

The powder may be supplied from storage containers such as silos or big bags and after that pass through a process zone and, if appropriate, a mixing and/or heating zone.

In order to allow good flowing of the powdered filling material through the injector, the flowing may be improved by pressure being applied. Fluidizing of the bulk material may be achieved by feeding air or some other process gas to the bulk material, preferably just before it is introduced into the injector. This means that the bulk material is at a first density in the storage container, the density is then reduced to a second density during the filling process and finally, during the evacuation, is increased to a third density, which preferably lies at least 30% above the first density.

The film layers may be connected, preferably thermally welded, at least all the way around the edge of the sheet-like structure. This is sufficient in particular whenever a one-piece VIP is to be produced. Preferably, however, there may also be other weldings within the outer welding, for example whenever a number of VIPs are to be produced at the same time within a film structure.

The welding of the layers can in principle take place in any desired way.

In a first preferred method sequence, which comes into consideration in particular in the case of the polyester nonwoven referred to above as flat filter material, it is recommendable that the connecting edge in method step c) is produced a small distance inward from the outer edge of the film or film connection and that the connecting edge in method step i) is at least partly produced outside the connecting edge produced in method step c). As a result, the connecting edges produced in method steps c) and i) lie virtually next to one another.

In the case of other sheet-like filter materials that can be tightly welded, however, it may alternatively also be provided that the connecting edge in method step i) is produced on the connecting edge produced in method step c).

Here, the sealing in method step i) takes place on the connecting edge that has already been produced in method step c). This procedure can be carried out for example with PP or PE nonwoven material.

A free-form sealing tool or a controlled, spot sealing tool, that is to say for example a welding bar with impulse sealing, comes into consideration for producing the connecting edges, in particular the connecting edge in method step i).

All of the sealing seams may in principle be formed at the same time. Preferably, however, two, three or more sealing seams are set at times one after the other during the process. This is the case in particular whenever a number of VIPs are to be produced at the same time in a film structure. Then, the sealing seams running around the entire film structure may be produced in a first sealing process, and are then therefore not final seams, and the sealing seams that separate the individual VIPs from one another may be produced in a further sealing process, and are then therefore final seams.

The powder, in particular the silica powder, may be introduced into the process with an initial density of 60 to 120 kg/m$^3$, for example the density in the silo or big bag, which then in the process is initially lowered further and finally in the process is brought to the final density, which lies at least 30% above the initial density, in the vacuum insulating body.

With the method according to the invention, this process thus proceeds in such a way that the powder-like filling material in a storage silo or large storage bag is at a first, medium density, during the filling into the receiving space is brought to a second, lower density and after the filling into the receiving space is compressed by evacuation and/or by mechanical pressing together to a third density that lies considerably above the first density. It is preferred in this case that the second density is approximately ¾ to ¼ of the first density, preferably approximately ½ of the first density.

The evacuation can take place in principle in any way desired. Preferably, however, the evacuation takes place in a two-stage process with application of a low vacuum and subsequently a high vacuum. In this case, the evacuation preferably takes place in a vacuum chamber.

After the filling of the powder into the receiving space, a pressing of the powder may take place. In this case, the pressing may take place before, during and/or after the evacuation.

Figure 2:
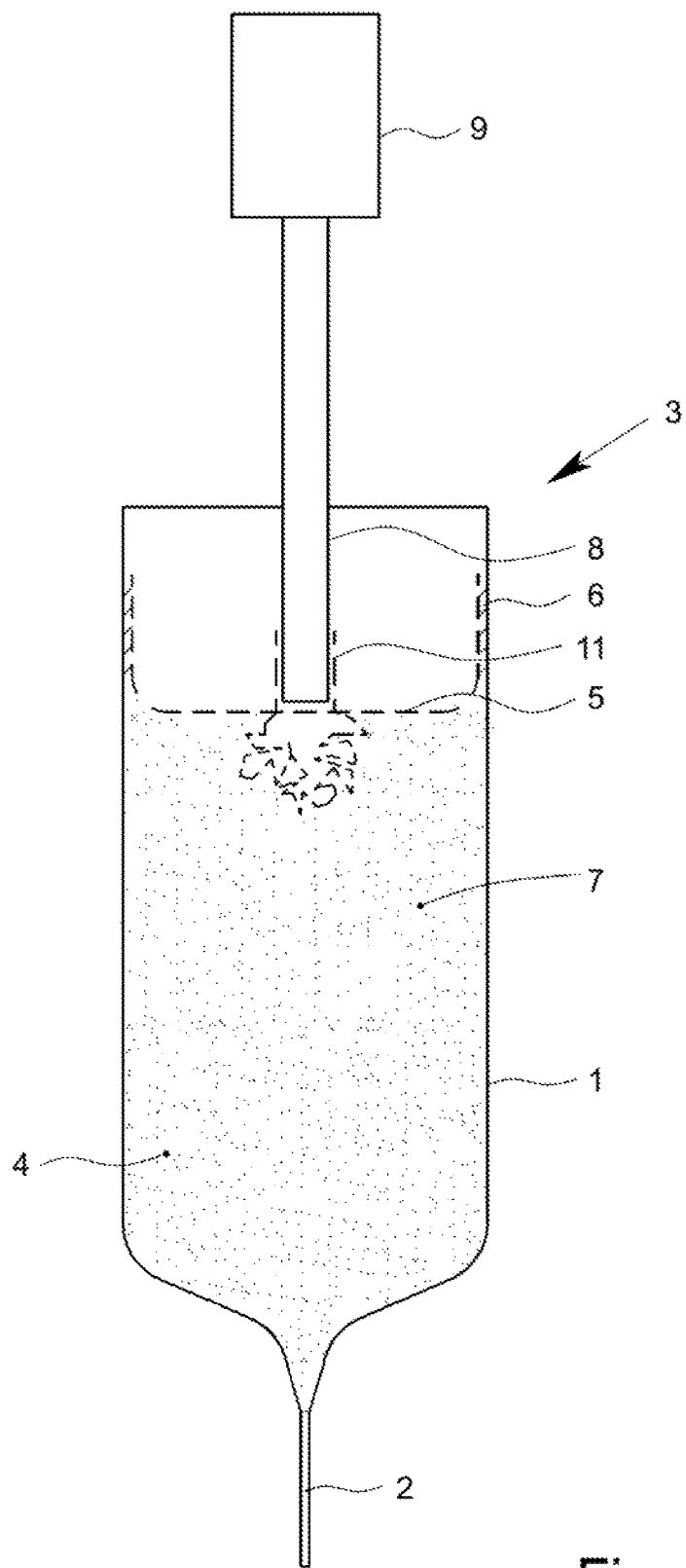
Figure 3:
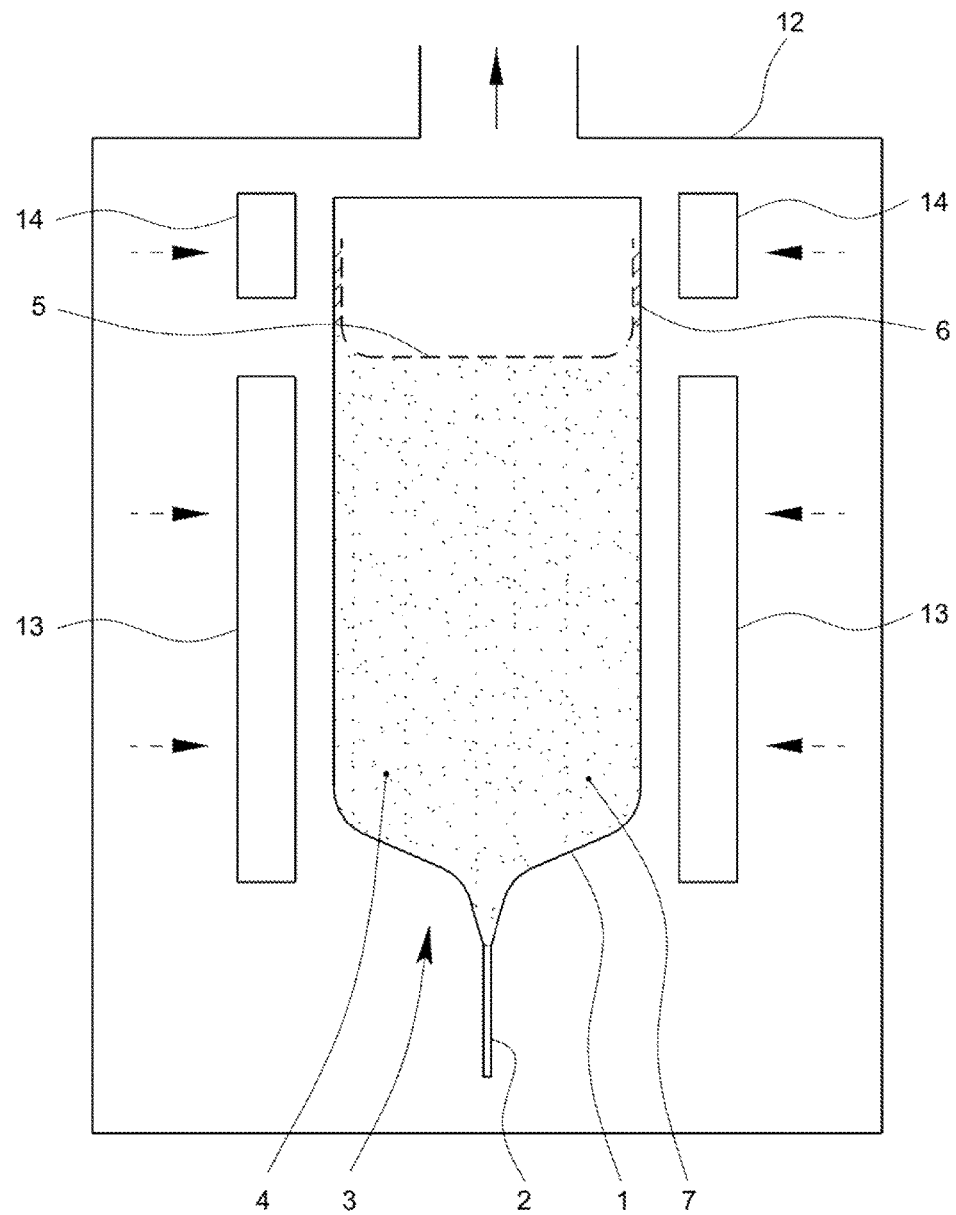
Figure 4:
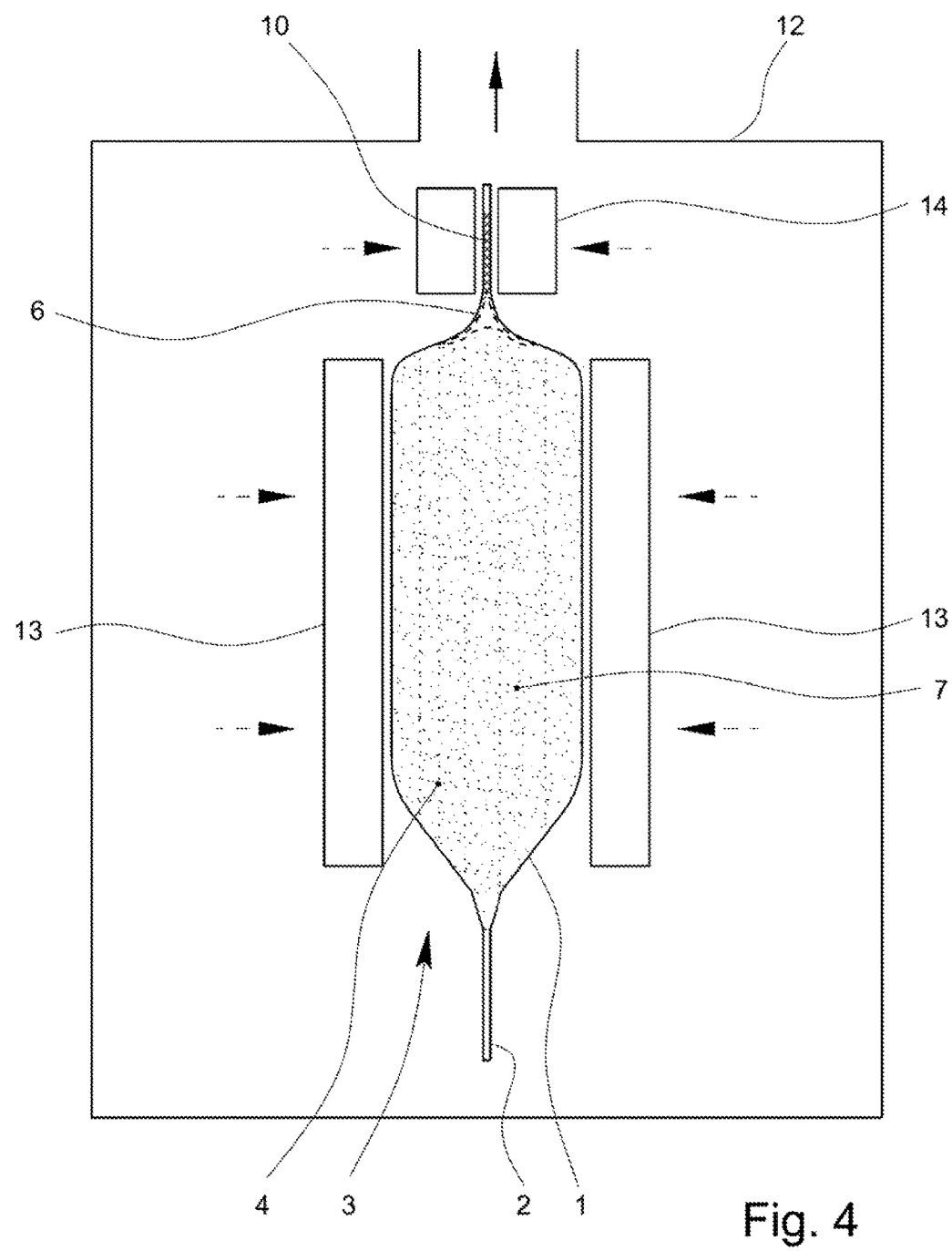
Figure 5:
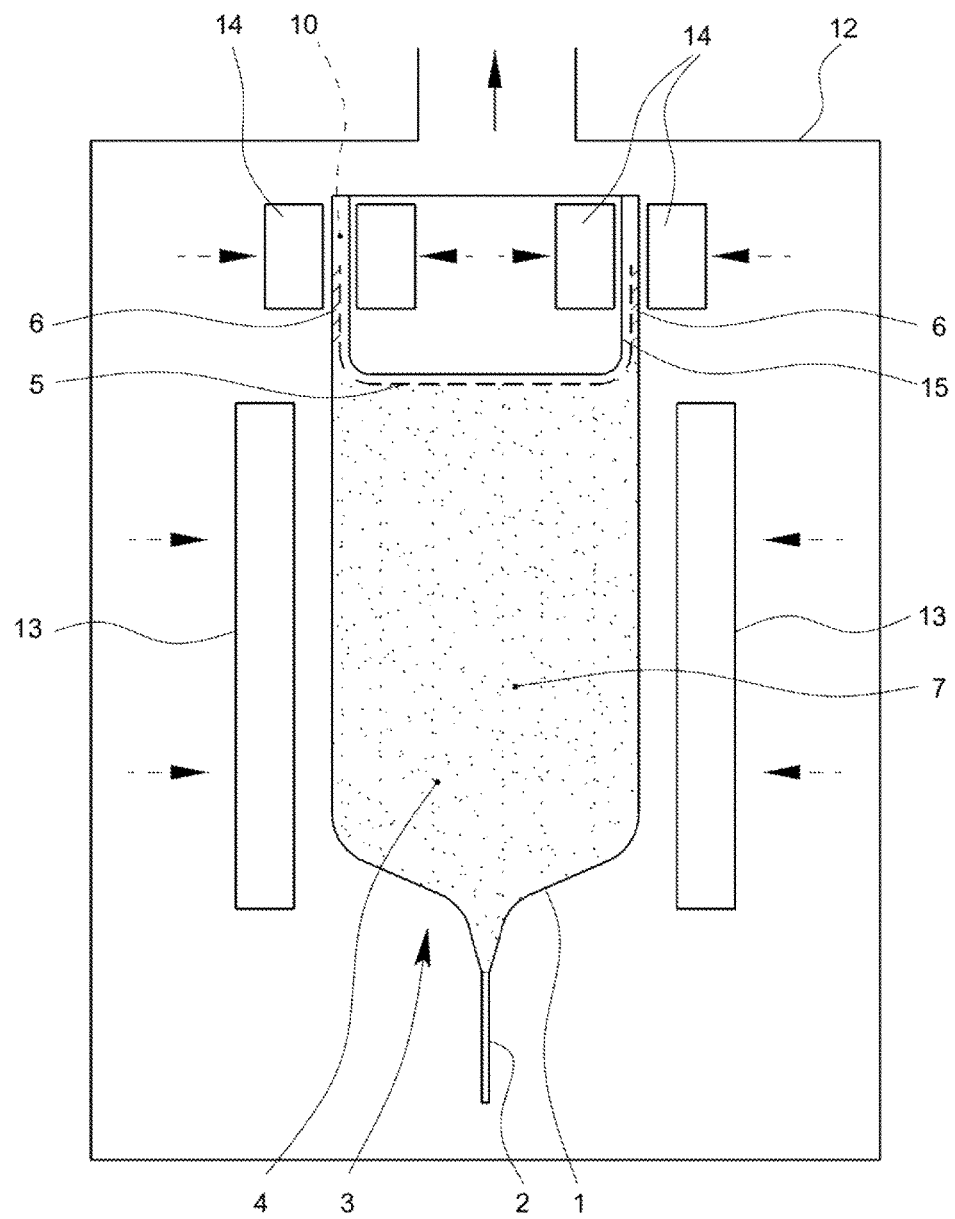

The invention is now explained in more detail below on the basis of a drawing that merely represents preferred exemplary embodiments. Preferred possibilities for refinements are also described in this explanation. In the drawing:

FIG. 1 shows a first step in the filling of the receiving space of a vacuum insulating body in a perspective view, simplified in a highly schematized form, FIG. 2 shows the container formed from the vacuum-tight film, completely filled, in a representation corresponding to FIG. 1, FIG. 3 shows the container from FIG. 2 in a vacuum chamber, FIG. 4 shows the container from FIG. 2 in a vacuum chamber, evacuated and pressed, FIG. 5 shows a further exemplary embodiment of a corresponding container in a vacuum chamber.

It can be ascertained from FIG. 1 how the first steps of a method according to the invention for producing a vacuum insulating body (vacuum insulation panel; VIP) proceed.

A first vacuum-tight film 1 or film connection, that is to say a multi-layer and/or coated film, is provided. In the exemplary embodiment represented, this film 1 as such is a tube-like high barrier film, which is for example a wafer-thin film of plastic coated with aluminum. This film may also be of a multi-layer configuration. This film is already closed in a vacuum-tight manner at the lower end of the tube by a welding 2. As a result, the tube-like vacuum-tight film 1 forms a kind of bag, which is open at the top. Altogether, this bag comprising the vacuum-tight film 1 is the initial state of the VIP 3.

FIG. 1 also shows a flat filter material 5 that is permeable to air but not permeable to a powder-like filling material 4, represented there by a dashed line. This flat filter material 5 has been firmly connected to the film 1 or film connection at the edges in such a way that the connecting edge 6 between the flat filter material 5 and the vacuum-tight film 1 or film connection is in any case not permeable to the powder-like filling material, preferably also not permeable to air as a result of the particular kind of connection. How such a durable connection is produced has been described in detail in the general part of the description. Thermal welding, ultrasonic welding and/or adhesive bonding come into consideration in particular.

It can be seen in FIG. 1 that the composite comprising the vacuum-tight film 1 and the flat filter material 5 is arranged in such a way that a receiving space 7 that can be filled with the powder-like filling material 4 but is closed off with respect to the outside is obtained in between. In FIG. 1, part of the powder-like filling material 4 has already been filled into the receiving space 7; the remaining receiving space 7 is still empty. The air displaced during the filling of the receiving space 7 can escape upward through the flat filter material 5. Entrained powder-like filling material 4 is however retained in the receiving space 7 by the filter material 5.

FIG. 1 also makes it clear how the powder-like filling material 4 is introduced into the receiving space 7. It is not introduced before attaching the flat filter material 5, but after attaching the flat filter material 5 to the vacuum-tight film 1 or film connection. A filling element 8 of a filling device 9 that passes through the flat filter material 5 serves for this purpose.

FIG. 1 shows the state with high ambient pressure, in particular therefore under normal atmospheric pressure. Under these boundary conditions, a desired amount of powder-like filling material 4 is filled into the receiving space 7 through the filling element 8 under a filling pressure that is (somewhat) higher than the ambient pressure. In principle, filling at ambient pressure is also possible. This takes longer, however, and is not as effective, particularly in the case of lightweight filling material 4.

Once the receiving space 7 has been filled with an appropriate amount of the powder-like filling material 4 in the desired way, the filling operation is completed. The filling element 8 is removed from the flat filter material 5 and the flat filter material 5 is closed again at the location concerned where it was passed through.

It is possible in principle to re-seal the flat filter material 5 at the location concerned by some separately applied effect, preferably from the outside. However, this always entails the risk of powder-like filling material 4 nevertheless escaping to the outside. It is accordingly provided by the preferred teaching of the invention that an air-permeable material that re-seals itself after removal of the filling element 8 in such a way that it is not permeable to the filling material 4 even at the location concerned is used as the flat filter material 5.

A filter material with randomly arranged filter material fibers is in particular such a self-sealing flat filter material 5. Particularly suitable for this is a single-layer or multi-layer nonwoven material, for example a polyester nonwoven. Specifically, examples of this have been described in the general part of the description.

The exemplary embodiment represented and preferred shows a design in which not only the flat filter material 5 as such is designed in a self-sealing manner but there is a construction in which the flat filter material 5 is provided with a self-sealing valve 11, here in the manner of a valve tube. The passing through of the flat filter material 5 takes place through the valve 11. When the filling element 8 is withdrawn, the tube-like valve 11 collapses in such a way that the flat filter material 5 re-seals itself at this location. This is schematically represented in FIG. 2.

A self-sealing valve 11 may also for example be embedded at the connecting edge 6 between the flat filter material 5 and the film 1 or film connection.

Suitable designs, in particular designs suitably adapted for the powder-like filling material 4 that is used, serve for the filling element a. Represented is a filling tube, which may preferably consist of metal.

Let us now continue with the description of the method for producing a VIP 3. So far, method steps a) to g) of claim 1 have been discussed.

FIG. 3 then shows the next method step. The composite comprising the film 1 or film connection and the flat filter material 5 and also the filling material 4 located in the receiving space 7 is brought as a whole to a considerably lower pressure (vacuum) in comparison with the ambient pressure in the previous method step. In this case, the receiving space 7 and the powder-like filling material 4 located therein are vented by themselves through the flat filter material. In practice, the interspaces between the small individual bodies of the powder-like filling material 4 are evacuated. Represented is a vacuum chamber 12, in which the future VIP 3 is located. A suction extraction connection is indicated at the top of the vacuum chamber 12 by an arrow.

If the VIP 3 created were connected at the top to the opening of the bag that is formed by the vacuum-tight film 1 or film connection and the space around the film 1 were not evacuated, the evacuation of the bag would have the effect that the bag is pressed together by itself.

The exemplary embodiment represented shows a variant in which the pressing together of the bag formed by the vacuum-tight film 1 and sealed by the flat filter material 5 takes place by pressing bars or pressing rams 13. These are arranged in the vacuum chamber 12 and press the bag into the form that is desired later for the VIP 3. This readily happens, because there is virtually no longer any air in the receiving space 7. For this reason, the interior of the bag can be pressed together to the apparent density of the powder-like filling material 4. All of this is schematically shown in FIG. 3. The pressing direction is indicated by the dashed arrows.

With a sustained vacuum, the vacuum-tight film 1, that is to say the VIP 3 being created, is finally firmly sealed completely around the edges in such a way that this connecting edge 10 is not permeable to air, and thus the receiving space 7 as a whole is sealed in an air-tight manner.

This operation can be seen in transition from FIG. 3 to FIG. 4. Indicated here as an example for producing the connecting edge 10 are hot sealing bars 14, which create the connecting edge 10 by pressing and establish the air-tight connection of the vacuum-tight film 1 or film connection to itself. In this way, the finished VIP 3 is achieved. It can be removed from the vacuum chamber 12.

FIG. 5 shows a somewhat different exemplary embodiment than FIG. 4. While in the exemplary embodiment of FIG. 3/4 in method step i) the connecting edge 10 is produced by connecting the vacuum-tight film 1 to itself, in the exemplary embodiment of FIG. 5 in method step i) the connecting edge 10 is produced between the vacuum-tight film 1 or film connection on the one hand and a second vacuum-tight film 15 or film connection on the other hand. As a result, a different shaping can be achieved at the open end of the vacuum-tight film 1; there is no restriction to the simple "squeezing together" of the vacuum-tight film 1 or film connection itself. Here, the hot sealing bars 14 are preferably arranged peripherally.

FIGS. 3 and 4 reveal a special aspect of the exemplary embodiment represented here of the method according to the invention. Here it is provided that the connecting edge 6 in method step c) is produced a small distance inward from the outer edge of the film 1 or film connection and that the connecting edge 10 in method step i) is at least partly produced outside the connecting edge 6 produced in method step c). It is ensured by this measure that the outerconnecting edge 10 between the two surfaces of the vacuum-tight film 1 or film connection, that is to say between the surfaces of the high barrier film or high barrier films (FIG. 5), is produced directly. This applies—here—in any case to the outer part of this connecting edge 10. This ensures that the flat filter material 5, which is often at least to a certain extent air-permeable even over a relatively great length of material, does not inadvertently lie in the connecting edge 10. As already stated in the general part of the description, this procedure is recommendable for example in the case of a PET nonwoven material.

In FIG. 4, the connecting edge 10 that is produced by the thermal welding by means of the hot sealing bars 14 can be seen, while in FIG. 5 the connecting edge is only indicated in its position by dashed-dotted lines, because it has not yet been produced there by the sealing bars 14.

If the flat filter material 5 is a material that is itself completely air-tight, in particular in the case of thermal welding or ultrasonic welding, it is also permissible to take the risk that the connecting edge 10 in method step i) is produced on the connecting edge 6 produced in method step c). As already referred to in the general part of the description, this procedure can be followed for example in the case of PE or PP nonwoven material.

Instead of the thermal sealing bars 14 represented, controlled, spot sealing tools or other corresponding sealing tools can also be used. In particular, an ultrasonic system also comes into consideration.

For the provision of the vacuum-tight film 1 or film connection on the one hand and the flat filter material 5 on the other hand, it may firstly be provided that they are provided in a size suitable for the VIP 3 to be produced. As an alternative and with preference, however, it is probably rather provided that both the vacuum-tight film 1 or film connection and the flat filter material 5 are provided as roll material and are processed continuously.

For the attachment of the sealing seams, reference may be made to the general part of the description. In particular in the case of relatively large films 1 that are processed from a roll it is possible to work with peripheral sealing seams that are not final seams.

In order to ensure expedient and effective filling of the receiving space 7 in the method for producing a VIP 3, particularly recommendable is a method in which the powder-like filling material 4 in a storage silo or large storage bag is at a first, medium density, during the filling into the receiving space 7 is brought to a second, lower density and after the filling into the receiving space 7 is compressed by evacuation and/or by mechanical pressing to a third density that lies considerably above the first density, the second density preferably being approximately ¾ to ¼ of the first density, preferably approximately ½ of the first density.

The invention claimed is:

1. A method for producing a vacuum insulating body, the method comprising:
   a) providing a vacuum-tight film or film connection;
   b) providing a flat filter material that is permeable to air but not permeable to a powder-like filling material;
   c) firmly connecting the flat filter material to the vacuum-tight film or film connection at the edges in such a way that the connecting edge between the flat filter material and the vacuum-tight film or film connection is not permeable to the powder-like filling material;
   d) arranging the vacuum-tight film or film connection and the flat filter material in such a way that a receiving space is obtained in between that can be filled with filling material and is closed off with respect to the outside;
   e) passing the flat filter material through with a filling element of a filling device for the powder-like filling material;
   f) with high ambient pressure under normal atmospheric pressure, filling a desired amount of powder-like filling material into the receiving space through the filling element under a filling pressure that is higher than the ambient pressure;
   g) after completion of the filling of the receiving space, removing the filling element from the flat filter material and closing the flat filter material again at the location concerned;
   h) bringing the composite comprising the vacuum-tight film or film connection and the flat filter material and also the filling material located in the receiving space as a whole to a pressure that is lower than the ambient pressure in method step f), wherein the receiving space and the powder-like filling material located therein are thereby vented through the flat filter material;
   i) with a sustained vacuum, firmly sealing the vacuum-tight film or film connection completely around the edges in such a way that this connecting edge is not permeable to air, and thus the receiving space as a whole is sealed in an air-tight manner.

2. The method as claimed in claim 1, further comprising using as the flat filter material an air-permeable material that re-seals itself after removal of the filling element in such a way that it is impermeable to the filling material also at the location concerned.

3. The method as claimed in claim 1, further comprising using a single-layer or multi-layer nonwoven material as the flat filter material.

4. The method as claimed in claim 1, further comprising providing the flat filter material or the connecting edge between the flat filter material and the vacuum-tight film or film connection with a self-sealing valve and wherein the passing through of the flat filter material in method step e) takes place via the valve.

5. The method as claimed in claim 1, further comprising using a filling tube of metal as the filling element.

6. The method as claimed in claim 1, further comprising providing both the vacuum-tight film or film connection and the flat filter material in a size suitable for the vacuum insulation panel VIP to be produced.

7. The method as claimed in claim 1, wherein in method step i), the connecting edge is produced by connecting the vacuum-tight film or film connection to itself.

8. The method as claimed in claim 1, wherein the connecting edge in method step c) is produced a small distance inward from the outer edge of the film or film connection and wherein the connecting edge in method step i) is at least partly produced outside the connecting edge produced in method step c).

9. The method as claimed in claim 1, wherein the connecting edge in method step i) is produced on the connecting edge produced in method step c).

10. The method as claimed in claim 1, wherein at least method steps h) and i) are carried out in a vacuum chamber.

11. The method as claimed in claim 1, wherein the powder-like filling material in a storage silo or large storage bag is at a first, medium density, during the filling into the receiving space is brought to a second, lower density and after the filling into the receiving space is compressed by at least one of evacuation by mechanical pressing together to a third density that lies considerably above the first density.

12. The method as claimed in claim 1, further comprising providing both the vacuum-tight film or film connection and the flat filter material as roll material and continuously processing both the vacuum-tight film or film connection and the flat filter material.

13. The method as claimed in claim 1, wherein in method step i), the connecting edge is produced between the vacuum-tight film or film connection and a second vacuum-tight film or film connection.

* * * * *